United States Patent
Bjorkman et al.

(10) Patent No.: US 11,492,810 B2
(45) Date of Patent: Nov. 8, 2022

(54) WATER RESISTANT WOOD FLOORING

(71) Applicant: AHF, LLC, Mountville, PA (US)

(72) Inventors: Travis E Bjorkman, Lancaster, PA (US); Matthew S Myers, Lititz, PA (US)

(73) Assignee: AHF, LLC, Mountville, PA (US)

( * ) Notice: Subject to any disclaimer, the term of this patent is extended or adjusted under 35 U.S.C. 154(b) by 0 days.

(21) Appl. No.: 16/731,450

(22) Filed: Dec. 31, 2019

(65) Prior Publication Data

US 2020/0208410 A1 Jul. 2, 2020

Related U.S. Application Data

(60) Provisional application No. 62/787,207, filed on Dec. 31, 2018.

(51) Int. Cl.
| | |
|---|---|
| *E04F 15/02* | (2006.01) |
| *C09D 15/00* | (2006.01) |
| *C09D 191/06* | (2006.01) |
| *D21J 1/16* | (2006.01) |
| *E04F 15/04* | (2006.01) |
| *D21J 1/08* | (2006.01) |

(52) U.S. Cl.
CPC ........ *E04F 15/02038* (2013.01); *C09D 15/00* (2013.01); *C09D 191/06* (2013.01); *D21J 1/08* (2013.01); *D21J 1/16* (2013.01); *E04F 15/045* (2013.01); *E04F 2201/0153* (2013.01); *E04F 2201/023* (2013.01)

(58) Field of Classification Search
CPC .............. E04F 15/02038; E04F 15/045; E04F 2201/0153; E04F 2201/023; C09D 15/00; C09D 191/06; D21J 1/08; D21J 1/16
See application file for complete search history.

(56) References Cited

U.S. PATENT DOCUMENTS

| | | | |
|---|---|---|---|
| 4,348,454 | A | 9/1982 | Eckberg |
| 4,528,081 | A | 7/1985 | Lien et al. |
| 6,006,486 | A * | 12/1999 | Moriau .................... F16B 5/008 52/589.1 |
| 6,715,253 | B2 | 4/2004 | Pervan |
| 6,898,913 | B2 | 5/2005 | Pervan |
| 9,598,526 | B1 | 3/2017 | Grigat et al. |
| 10,358,830 | B2 * | 7/2019 | Pervan .............. E04F 15/02038 |
| 10,370,560 | B2 | 8/2019 | Li et al. |
| 2003/0024199 | A1 * | 2/2003 | Pervan .............. E04F 15/02038 52/592.1 |
| 2007/0006543 | A1 * | 1/2007 | Engstrom ................. E04C 2/38 52/582.1 |

(Continued)

FOREIGN PATENT DOCUMENTS

| | | | | |
|---|---|---|---|---|
| CA | 2289309 | A1 * | 7/2000 | ................ C09J 5/08 |
| CN | 2801950 | Y | 8/2006 | |

(Continued)

*Primary Examiner* — Theodore V Adamos
(74) *Attorney, Agent, or Firm* — Budzyn IP Law, LLC

(57) ABSTRACT

Wood flooring is described, which provides resistance to surface liquids by reducing or eliminating checking on the surface of the wood and transmission liquid through the seams in an installed wood floor. This is achieved by combining a surface coating, a wood veneer and core or solid wood, a tongue and groove profile, and application of a sealer along the tongue and groove or locking profile.

17 Claims, 2 Drawing Sheets

(56) References Cited

U.S. PATENT DOCUMENTS

| | | | |
|---|---|---|---|
| 2009/0133353 A1* | 5/2009 | Pervan | H01F 7/122 52/588.1 |
| 2009/0320402 A1* | 12/2009 | Schacht | E04F 15/04 52/588.1 |
| 2011/0030303 A1* | 2/2011 | Pervan | E04F 15/02 52/582.1 |
| 2011/0167744 A1* | 7/2011 | Whispell | E04F 15/02 52/309.1 |
| 2013/0008118 A1* | 1/2013 | Baert | B29C 63/044 52/588.1 |
| 2013/0014463 A1* | 1/2013 | Pervan | E04F 15/107 52/588.1 |
| 2013/0025964 A1* | 1/2013 | Ramachandra | C08L 97/02 181/284 |
| 2013/0104478 A1* | 5/2013 | Meersseman | B32B 3/06 52/309.1 |
| 2013/0269279 A1 | 10/2013 | Fowler | |
| 2014/0033633 A1* | 2/2014 | Kell | E04G 23/0285 52/588.1 |
| 2014/0237925 A1* | 8/2014 | Hannig | E04C 2/20 52/309.1 |
| 2015/0167318 A1* | 6/2015 | Pervan | E04F 15/04 52/582.2 |
| 2016/0193857 A1* | 7/2016 | De Mondt | E04B 1/6125 52/311.1 |
| 2016/0325558 A1* | 11/2016 | Strijckers | B41J 2/01 |
| 2016/0347084 A1* | 12/2016 | Clement | B44C 5/0469 |
| 2018/0002933 A1* | 1/2018 | Pervan | E04F 15/02038 |
| 2018/0155934 A1* | 6/2018 | D'Hondt | E04F 15/02038 |
| 2020/0102756 A1* | 4/2020 | Pervan | E04F 15/02038 |

FOREIGN PATENT DOCUMENTS

| | | |
|---|---|---|
| CN | 201627334 U | 11/2010 |
| CN | 203334610 U | 12/2013 |
| CN | 205918051 U | 2/2017 |
| CN | 206174394 U | 5/2017 |
| CN | 106976135 A | 7/2017 |
| CN | 206928590 U | 1/2018 |
| CN | 108556435 A | 9/2018 |
| CN | 208456036 U | 2/2019 |
| JP | 2003013588 A | 1/2003 |

* cited by examiner

WATER RESISTANT WOOD FLOORING

BACKGROUND

Field of the Invention

Wood flooring is disclosed, which provides resistance to surface liquids by reducing or eliminating checking on the surface of the wood and transmission liquid through the seams in an installed wood floor. This is achieved by combining a surface coating, a core, a tongue and groove profile, and application of a sealer along the tongue and groove or locking profile.

Summary of Related Art

US Patent Application Publication No. 2013/0269279 seeks to address the issues of water resistance in laminate flooring. The laminate flooring requires the addition of various profile sealers, but also requires the material to be cured at high temperatures. The high temperature cure makes the material difficult to prepare. In addition, there is no discussion of a solution for wood flooring.

SUMMARY OF THE INVENTION

The wood flooring of some embodiments provides a wood flooring that prevents the penetration of water from a top surface of the flooring to the opposing surface of the flooring along the seams where one or more planks or boards meet. This includes either solid wood flooring or the combination of a wood veneer and a core, a locking profile that includes both a horizontal locking element and vertical locking element; and a sealer along the entire surface of the locking profile.

A wood flooring component comprising:
(a) a structure selected from
 (i) a solid wood component; or
 (ii) a top veneer layer and a core
(b) a coating on a top surface of said wood flooring component
(c) optionally including a balance layer such as one having a coating on a bottom surface same as top; and
(d) a locking profile on an edge comprising a horizontal locking element and a vertical locking element; wherein said locking profile includes a sealer.

A flooring system comprising at least a first flooring component and a second flooring component, each of said first and second flooring components comprising:
(a) a top veneer layer having a coating on a top surface;
(b) a core;
(c) a balance layer optionally having a coating on a bottom surface same as top; and
(d) a locking profile on an edge comprising a horizontal locking element and a vertical locking element; wherein said first flooring component comprises a locking profile including a sealer that mates with a locking profile on said second flooring component.

A method for preparing a water resistant wood flooring component comprising:
(a) providing a top wood veneer having a top surface and a bottom surface, a balance layer having a top surface and a bottom surface, and a core;
(b) adhering said bottom surface of said top wood veneer to atop of said core and adhering said top surface of said balance layer to a bottom of said core to form a wood flooring component;
(c) adding a locking profile to an edge of said wood flooring component;
(d) applying a coating to the top surface of said top wood veneer and said bottom surface of said balance layer;
(e) applying a sealer to substantially cover said locking profile.

DETAILED DESCRIPTION

Veneer or Solid

Figure 1:
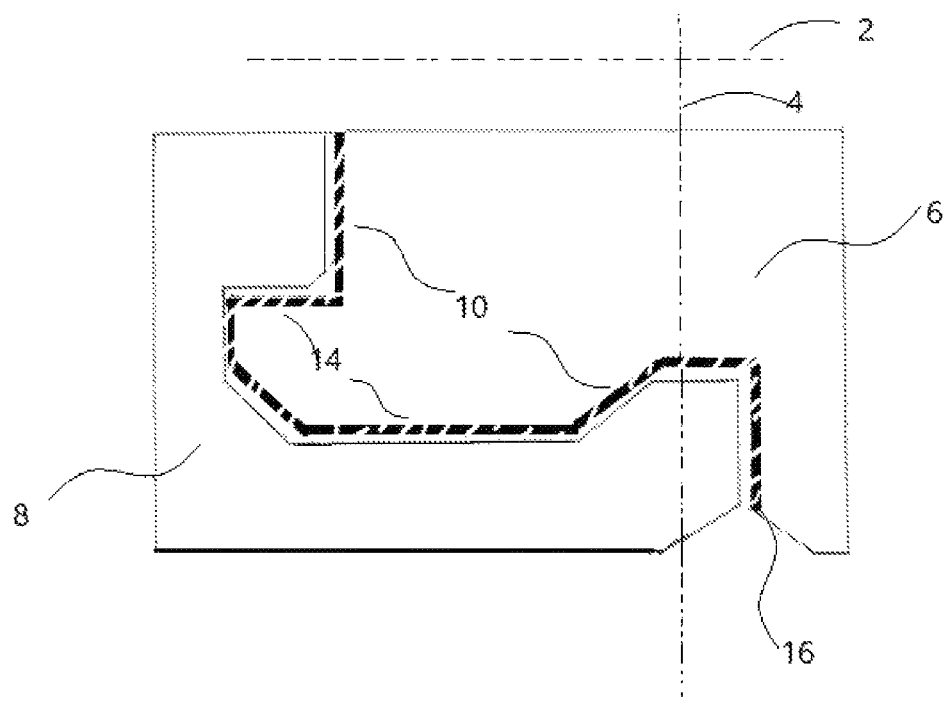
FIGS. 1-3 show detail of locking profile cross-sections.

The species of the veneer or solid may vary to include either hardwood or softwood. The veneer may also have been treated to increase its density to reduce or eliminate damage due to denting. Non-limiting examples of suitable hardwood species include Aspen, poplar, hickory, maple, oak, beech, and ash, among others. Typically, Aspen and or poplar may be included as the primary or sole species. Non-limiting examples of suitable softwood species include pine, fir, spruce, cedar, and combinations thereof. The veneer or microveneer may have any suitable thickness, such as about 0.05 mm to 6 mm about 0.5 mm to about 5 mm, and about 0.6 to about 1.2. The veneer may be rotary, sawn, or slice veneer.

Core

The core may be made from any suitable cellulosic or polymeric core material. Cellulosic materials include, but are not limited to MDF, HDF, particle board, strand board, or cellulosic or wood-based materials, among others. Wood-based materials such as medium density fiberboard (MDF) or high density fiberboard (HDF) are typically made from combining wood particles such as dust, fiber, strand or chips with a resin under pressure to provide a sheet. Such resins are well-known in the art. Various polymeric resins, such as thermosetting resins, may be employed as binders for the wood flakes or strands. Suitable polymeric binders include isocyanate resin, urea-formaldehyde, polyvinyl acetate ("PVA"), phenol formaldehyde, melamine formaldehyde, melamine urea formaldehyde ("MUF") and the co-polymers thereof. Isocyanates may be preferred where providing a formaldehyde-free product is desired. Isocyanates may be selected from the diphenylmethane-p,p'-diisocyanate group of polymers, which have NCO-functional groups that can react with other organic groups to form polymer groups such as polyurea (—NCON—), and polyurethane, (—NCOO—); a binder with about 50 wt % 4,4-diphenylmethane diisocyanate ("MDI") or in a mixture with other isocyanate oligomers ("pMDI") may be included. A suitable commercial pMDI product is Rubinate 1840 available from Huntsman, Salt Lake City, Utah and Mondur 541 available from Bayer Corporation, North America, of Pittsburgh, Pa. Suitable commercial MUF binders are the LS 2358 and I S 2250 products from the Dynea Corporation.

The binder loading level is about 2 wt % to about 15 wt %, including about 3 wt % to about 8 wt %, and about 4 wt % to about 6 wt % of the weight of the oven-dried wood fiber, strands, etc.

The sheet or board may be about 3 mm to about 15 mm and may be MDF or have a higher density than MDF. Typically the density of the fiberboard will be about 700 kg/m3, including fiberboard with a density of about 750 kg/m3 or higher, and about 800 kg/m3 or higher.

Suitable polymeric core materials include polyvinyl chloride, polyester, polyolefin, polyurethane, and nylon, among others and combinations thereof. These materials will typically include a filler such as fiber, bead, powder, and the like, and combinations thereof. The filler may be glass or mineral (such as limestone, clay or talc), polymeric, organic materials or combinations thereof.

Examples of commercially available cores include stone polymer composite (SPC), wood polymer composite (WPC), wallboard/MgO board, and combinations thereof, among others.

Either of the veneer and/or balance layer may be adhered to the core by an adhesive. Any suitable adhesive may be included. Suitable adhesives include those selected from the group consisting of polyvinyl acetate, urea formaldehyde, acid-catalyzed phenolic resin, methylene diphenylene isocyanate (MDI), and combinations thereof. Any of the resins useful as the binder may also be used as the adhesive.

Coating

The coating must be of sufficient thickness and coverage to prevent checking/topical damage to the solid wood or wood veneer. The covering may cover the surface of the wood and the ends to seal the edges, which is especially important for the short ends at the end of the wood grain. Many examples of suitable coating layers are commercially available and well-known in the art. Examples of suppliers that provide suitable compositions include PPG Industries, Sherwin Williams, Akzo Nobel, and Valspar, among others. An abrasion resistant particle may be added to any of these compositions.

The coating matrix may be a curable coating composition comprising a binder and other additives, such as photoinitiators described below. According to some embodiments, the binder may include acrylate-functional compounds and the abrasion resistant particles comprise a mixture of diamond particles (of micron and/or nano-size) and second abrasion resistant particles.

The binder may include resin selected from acrylate-functional polymer, acrylate-functional oligomer, acrylate-functional monomer, and combinations thereof. The acrylate-functional polymer may include polyester acrylate, polyurethane acrylate, polyether acrylate, polysiloxane acrylate, polyolefin acrylate, and combinations thereof.

A suitable polyester acrylate may be a linear or branched polymer having at least one acrylate or (meth)acrylate functional group. In some embodiments, the polyester acrylate has at least 1 to 10 free acrylate groups, (meth)acrylate groups, or, a combination thereof.

The polyester acrylate may have an acrylate functionality The polyester acrylate may be the reaction product of polyester polyol and an carboxylic acid functional acrylate compound such as acrylic acid, (meth)acrylic acid, or a combination thereof at a OH:COOH ratio of about 1:1. The polyester polyol may be a polyester diol having two hydroxyl groups present at terminal end of the polyester chain. In some embodiments, the polyester polyol may have a hydroxyl functionality ranging from 3 to 9, wherein the free hydroxyl groups are present at the terminal ends of the polyester chain or along the backbone of the polyester chain.

In non-limiting embodiments, the polyester polyol may be the reaction product of a hydroxyl-functional compound and a carboxylic acid functional compound. The hydroxyl-functional compound is present in a stoichiometric excess to the carboxylic-acid compound. In some embodiments the hydroxyl-functional compound is a polyol, such a diol or a tri-functional or higher polyol (e.g. triol, tetrol, etc.). In some embodiments the polyol may be aromatic, cycloaliphatic, aliphatic, or a combination thereof. In some embodiments the carboxylic acid-functional compound is dicarboxylic acid, a polycarboxylic acid, or a combination thereof. In some embodiments, the dicarboxylic acid and polycarboxylic acid may be aliphatic, cycloaliphatic, aromatic.

A diol may be selected from alkylene glycols, such as ethylene glycol, propylene glycol, diethylene glycol, dipropylene glycol, triethylene glycol, tripropylene glycol, hexylene glycol, polyethylene glycol, polypropylene glycol and neopentyl glycol; hydrogenated bisphenol A; cyclohexanediol; propanediols including 1,2-propanediol, 1,3-propanediol, butyl ethyl propanediol, 2-methyl-1,3-propanediol, and 2-ethyl-2-butyl-1,3-propanediol; butanediols including 1,4-butanediol, 1,3-butanediol, and 2-ethyl-1,4-butanediol; pentanediols including trimethyl pentanediol and 2-methylpentanediol; cyclohexanedimethanol; hexanediols including 1,6-hexanediol; caprolactonediol (for example, the reaction product of epsilon-caprolactone and ethylene glycol); hydroxy-alkylated bisphenols; polyether glycols, for example, poly(oxytetramethylene) glycol. In some embodiments, the tri-functional or higher polyol may be selected from trimethylol propane, pentaerythritol, di-pentaerythritol, trimethylol ethane, trimethylol butane, dimethylol cyclohexane, glycerol and the like.

In some embodiments the dicarboxylic acid may be selected from adipic acid, azelaic acid, sebacic acid, succinic acid, glutaric acid, decanoic diacid, dodecanoic diacid, phthalic acid, isophthalic acid, 5-tert-butylisophthalic acid, tetrahydrophthalic acid, terephthalic acid, hexahydrophthalic acid, methylhexahydrophthalic acid, dimethyl terephthalate, 2,5-furandicarboxylic acid, 2,3-furandicarboxylic acid, 2,4-furandicarboxylic acid, 3,4-furandicarboxylic acid, 2,3,5-furantricarboxylic acid, 2,3,4,5-furantetracarboxylic acid, cyclohexane dicarboxylic acid, chlorendic anhydride, 1,3-cyclohexane dicarboxylic acid, 1,4-cyclohexane dicarboxylic acid, and anhydrides thereof, and mixtures thereof. In some embodiments the polycarboxylic acid may be selected from trimellitic acid and anhydrides thereof.

In some embodiments, the acrylate-functional polyurethane may be a linear or branched polymer having at least one functional group selected from an acrylate group or a (meth)acrylate group. In some embodiments, the acrylate-functional polyurethane may have at least 2 to 9 functional groups selected from an acrylate group, a (meth)acrylate group, or a combination thereof. In some embodiments, the acrylate-functional polyurethane has between 2 and 4 functional groups selected from an acrylate group, (meth)acrylate group, or a combination thereof.

In some embodiments, the acrylate functional polyurethane may be the reaction product of a high molecular weight polyol and diisocyanate, polyisocyanate, or a combination thereof. The high molecular weight polyol may be selected from polyester polyol, polyether polyol, polyolefin polyol, and a combination thereof—the high molecular weight polyol having a hydroxyl functionality ranging from 3 to 9.

In some embodiments, the polyester polyol used to create the acrylate-functional polyurethane is the same as used to create the acrylate functional polyester. In some embodiments, the polyether polyol may be selected from polyethylene oxide, polypropylene oxide, polytetrahydrofuran, and mixtures and copolymers thereof.

A high molecular weight polyol may be reacted with polyisocyanate, such as a diisocyanate, a tri-functional isocyanate (e.g. isocyanurate), higher functional polyisocyanates, or a combination thereof in an NCO:OH ratio ranging from about 2:1 to 4:1. The polyisocyanate may be selected from isophorone diisocyanate, 4,4'-dicyclohexylmethane-diisocyanate, and trimethyl-hexamethylene-diisocyanate, 1,6 hexamethylene diisocyanate, 2,2,4-trimethylhexamethylene diisocyanate, octadecylene diisocyanate and 1,4 cyclohexylene diisocyanate. toluene diisocyanate; methylenediphenyl diisocyanate; tetra methylxylene diisocyanate, and isocyanurates, biurets, allophanates thereof, as well as mixtures thereof. The resulting reaction product is an isocyanate-terminated prepolymer.

the isocyanate-terminated prepolymer is then reacted with hydroxyl-functional, acrylate compound in an NCO:OH ratio of about 1:1 to yield an acrylate or (meth)acrylate functional polyurethane. The hydroxyl-functional acrylate compounds may include hydroxyethyl acrylate, hydroxyethyl methacrylate, hydroxypropyl acrylate, hydroxypropyl methacrylate, hydroxybutyl acrylate, hydroxybutyl methacrylate, hydroxypentyl acrylate, hydroxypentyl methacrylate, hydroxyhexyl acrylate, hydroxyhexyl methacrylate, aminoethyl acrylate, and aminoethyl methacrylate, and a combination thereof.

According to some embodiments, the binder may include acrylate-functional oligomers that include mono-functional oligomers, di-functional oligomers, tri-functional oligomers, tetra-functional oligomers, penta-functional oligomers, and combinations thereof.

Mono-functional oligomers may be selected from alkoxylated tetrahydrofurfuryl acrylate; alkoxylated tetrahydrofurfuryl methylacrylate; alkoxylated tetrahydrofurfuryl ethylacrylate; alkoxylated phenol acrylate; alkoxylated phenol methylacrylate; alkoxylated phenol ethylacrylate; alkoxylated nonylphenol acrylate; alkoxylated nonylphenol methylacrylate; alkoxylated nonylphenol ethylacrylate, and mixtures thereof. The alkoxylation may be performed using ethylene oxide, propylene oxide, butylene oxide, or mixtures thereof. In some embodiments the degree of alkoxylation ranges from about 2 to 10. In some embodiments, the degree of alkoxylation ranges from about 4 to 6.

The di-functional oligomers may be selected from ethylene glycol diacrylate, propylene glycol diacrylate, diethylene glycol diacrylate, dipropylene glycol diacrylate, triethylene glycol diacrylate, tripropylene glycol diacrylate, polyethylene glycol diacrylate, polypropylene glycol diacrylate, ethoxylated bisphenol A diacrylate, bisphenol A diglycidyl ether diacrylate, resorcinol diglycidyl ether diacrylate, 1,3-propanediol diacrylate, 1,4-butanediol diacrylate, 1,5-pentanediol diacrylate, 1,6-hexanediol diacrylate, neopentyl glycol diacrylate, cyclohexane dimethanol diacrylate, ethoxylated neopentyl glycol diacrylate, propoxylated neopentyl glycol diacrylate, ethoxylated cyclohexanedimethanol diacrylate, propoxylated cyclohexanedimethanol diacrylate, and mixtures thereof.

Tri-functional oligomers may be selected from trimethylol propane triacrylate, isocyanurate triacrylate, glycerol triacrylate, ethoxylated trimethylolpropane triacrylate, propoxylated trimethylolpropane triacrylate, tris (2-hydroxyethyl) isocyanurate triacrylate, ethoxylated glycerol triacrylate, propoxylated glycerol triacrylate, pentaerythritol triacrylate, melamine triacrylates, and mixtures thereof.

An acrylate-functional monomer may be selected from acrylic acid, methacrylic acid, ethyl acrylic acid, 2-phenoxyethyl acrylate; 2-phenoxyethyl methylacrylate; 2-phenoxyethyl ethylacrylate; tridecryl acrylate; tridecryl methylacrylate; tridecryl ethylacrylate; and mixtures thereof.

Some embodiments may further include acrylate functional monomers selected from alkyl acrylates having up to about 12 carbon atoms in the alkyl segment such as ethyl acrylate, butyl acrylate, 2-ethylhexyl acrylate, amyl acrylate, n-lauryl acrylate, nonyl acrylate, n-octyl acrylate, isooctyl acrylate, isodecyl acrylate, etc.; alkoxyalkyl acrylates such as methoxybutyl acrylate, ethoxyethyl acrylate, ethoxypropyl acrylate, etc.; hydroxyalkyl acrylates such as hydroxyethyl acrylate, hydroxybutyl acrylate, etc.; alkenyl acrylates such as trimethoxyallyloxymethyl acrylate, allyl acrylate, etc.; aralkyl acrylates such as phenoxyethyl acrylate, benzyl acrylate, etc.; cycloalkyl acrylates such as cyclohexyl acrylate, cyclopentyl acrylate, isobornyl acrylate, etc.; aminoalkyl acrylates such as diethylaminoethyl acrylate; cyanoalkyl acrylates such as cyanoethyl acrylate, cyanopropyl acrylate, etc.; carbamoyloxy alkyl acrylates such as 2-carbamoyloxyethyl acrylate, 2-carbamoyl-oxypropyl acrylate, N-methylcarbamoyloxyethyl acrylate, N-ethylcarbamoyloxymethyl acrylate, 2-(N-methylcarbamoyloxy)-ethyl acrylate, 2-(N-ethylcarbamoyloxy)ethyl acrylate, etc.; and the corresponding methacrylates. In some embodiments, the alkyl acrylates having up to about 12 carbon atoms in the alkyl segment may be used as a reactive solvent/diluent in the abrasions resistant coating layer.

The acrylate-functional monomers may include the binder may comprise resin selected from acrylate-functional polymer, acrylate-functional oligomer, acrylate-functional monomer, and combinations thereof.

In some non-limiting embodiments, the acrylate-functional monomer may be selected from acrylic acid, methacrylic acid, ethyl acrylic acid, 2-phenoxyethyl acrylate; 2-phenoxyethyl methylacrylate; 2-phenoxyethyl ethylacrylate; tridecryl acrylate; tridecryl methylacrylate; tridecryl ethylacrylate; and mixtures thereof.

In some embodiments, the acrylate-functional monomer or oligomer is a silicone acrylate. Curable silicone acrylates are known and suitable silicone acrylates are disclosed, for example in U.S. Pat. Nos. 4,528,081 4,348,454, herein incorporated by reference. Suitable silicone acrylates include silicone acrylates having mono-, di-, and tri-acrylate moieties. Suitable silicone acrylates include, for example, Silcolease® UV RCA 170 and UV Poly 110, available from Blue Star Co. Ltd, China; and Silmer ACR D2, Silmer ACR Di-10, Silmer ACR Di-50 and Silmer ACR Di-100, available from Siltech.

The coating matrix may further include photoinitiator to facilitate UV curing of the curable coating composition. In some non-limiting embodiments, the photoinitiators may include a benzoin compound, an acetophenone compound, an acylphosphine oxide compound, a titanocene compound, a thioxanthone compound or a peroxide compound, or a photosensitizer such as an amine or a quinone. Specific examples photoinitiatiors include 1-hydroxycyclohexyl phenyl ketone, benzoin, benzoin methyl ether, benzoin ethyl ether, benzoin isopropyl ether, benzyl diphenyl sulfide, tetramethylthiuram monosulfide, azobisisobutyronitrile, dibenzyl, diacetyl and beta-chloroanthraquinone. In some embodiments, the photoinitators are water soluble alkylphenone photoinitiators.

The coating matrix may further include an amine synergist. In some embodiments, the amine synergist may include diethylaminoethyle methacrylate, dimethylaminoethyl methacrylate, N—N-bis(2-hydroxyethyl)-P-toluidine, Ethyl-4-dimethylamino benzoate, 2-Ethylhexyl 4-dimethylamino benzoate, as well as commercially available amine synergist, including Sartomer CN 371, CN373, CN383, CN384 and CN386; Allnex Ebecry P104 and Ebecry P115. The amine synergist may be present in the radiation curable coating composition by an amount ranging from about 1 wt. % to about 5 wt. %, preferably about 3 wt. %

The coating may include abrasion resistant particles that help impart wear and scratch resistance. The improved wear and scratch resistance extends the life span of the floor covering. Examples of the abrasion resistant particles include a combination of abrasion resistant particles, each exhibiting a Mohs hardness value ranging from 6 to 10—including all integers therebetween, as measured on the Mohs scale of mineral hardness. In some embodiments, the abrasion resistant particles may be selected from diamond (Mohs value of 10), aluminum oxide (Mohs value of 9), topaz (Mohs value of 8), quartz (Mohs value of 7), nepheline syenite or feldspar (Mohs value of 6), ceramic or ceramic microspheres (Mohs value of 6), and combinations thereof. The abrasion resistant particle may be a combination of a first abrasion resistant particle consisting of diamond particles and a second abrasion resistant particle having a Mohs value of less than 10. In some embodiments, the coating layer of the present invention may comprise an amount of abrasion resistant particle ranging from about 6 wt. % to about 25 wt. % based on the total weight of the coating layer. In some embodiments, the coating layer of the present invention may comprise an amount of abrasion resistant particle ranging from about 6 wt. % to about 12 wt. % based on the total weight of the coating layer.

According to some embodiments, the abrasion resistant particle is a combination of diamond particle and aluminum oxide particles. According to some embodiments, the aluminum oxide particles may have a variety of particle sizes including a mixture of different sized diamond particles. In some non-limiting embodiments, the aluminum oxide particles of the present invention may have an average particle size that is selected from the range of about 2 μm to about 30 μm. In some non-limiting embodiments, the diamond particles of the present invention may have an average particle size that is selected from range of about 2 μm about 100 μm, such as about 5 μm about 50 μm.

Balance Layer

The balance layer may be present on a bottom surface of the core or the solid wood. Where the balance layer is included, it would be between a surface of the core and a subfloor. Suitable balance layers include, but are not limited to, a veneer, a coating, paper, cork, foam, rubber, kraft paper, IXPE pad, underlayment, other balance layers as well-known in the art, and combinations thereof. The balance layer may be bonded to the core by means of an adhesive.

Sealer

The sealer will prevent water from transferring through the voids in the locking profile from one surface of the wood flooring component to the opposing surface upon installation of two adjacent boards. FIG. 1 shows the one example of application of the sealer 16. While the wax 16 appears to be on the tongue side 6 in the figure, the sealer may be present on the tongue side 6, the groove side 8, or both. One suitable type of sealer will flow upon installation to achieve a more complete seal. Optionally, heat may be applied to permit or assist the sealer to flow within locking profile.

A variety of different compositions may be useful as the sealer. The sealer may include a wax, silicone, rubber, other substance having hydrophobic characteristics, and combinations thereof. Examples of suitable waxes include microcrystalline wax, fluorinated wax, and paraffin wax among others, as well as mixtures and combinations thereof.

A variety of different sealers and/or waxes are useful to prevent water transmission/seepage. However, the wax must have certain properties. Generally, the sealer must be hydrophobic and have the ability to flow, either at room temperature or upon application of heat. The sealer will flow within the voids of the locking profile on installation when corresponding portions of the locking profile are engaged/mated. Examples of suitable sealers include microcrystalline wax, fluorinated wax, wax emulsions, including fluorinated wax emulsions, and paraffin wax among others. For the purposes of this disclosure, the terms wax and wax emulsion are used interchangeably.

For the purposes of this disclosure, the terms wax and wax emulsion are used interchangeably to refer to a wax or sealer composition with wax-like properties, which may be a liquid or a solid at room temperature. The sealer, such as a wax must meet testing to demonstrate that the sealer has the sufficient properties to prevent the infiltration of water through the seams created upon installation at the locking profile. This testing includes a water infiltration test, described in detail in the examples section.

Wax or wax emulsion materials that may comprise the sealer include plant, animal and petroleum (e.g., Fischer-Tropsch) derived waxes that may be present as an emulsion. Suitable petroleum waxes include polyethylene waxes, polypropylene waxes and combinations thereof. Suitable polyethylene waxes may be oxidized or co-polymerized with acrylic acid to give the polyethylene chemical functionality which allows it to be emulsified in the aqueous solution. Polyethylene materials that are free of functional groups may also be used. The polyethylene may be classified as high density polyethylene (HDPE) or low density polyethylene (LDPE). HDPE is higher melting (110° C.-140° C.) and is harder. LDPE is lower melting (100° C.-110° C.) and softer. The wax may also be classified as non-ionic, cationic or anionic.

An example of a commercially available polyethylene wax is Poly Emulsion 325G available from ChemCor, Lubrizol Lanco Liquimatt 6035, Lubrizol Lanco Liquimatt 6375, Lubrizol Lanco Liquimatt 6040 each available from Lubrizol, Michelman Michem Guard 7140, Michelman Michem Guard 350, Michelman Michem Guard 25, Michelman Michem Guard 55, and Michelman Michem Guard 349 each available from Michelman. Suitable alkali soluble emulsions include Acrysol products available from DOW and Latekoll products, such as Latekoll D, available from BASF. Such waxes are provided in U.S. Pat. No. 10,370,560, which is incorporated by reference in its entirety.

Other suitable wax emulsions are provided in U.S. Pat. No. 9,598,526 (the '526 patent), which is incorporated by reference in its entirety. This patent discloses aqueous dispersions of fluorinated compounds that are useful as a wax or wax emulsion in some embodiments.

As described in the '526 patent, the fluorinated compound comprising a reaction product of a polyisocyanate component and a diol component or a diamine component or a mixture thereof, the reaction product further reacted with an organic component comprising molecules of at least one compound having a plurality of fluorinated carbon atoms and at least one isocyanate reactive functionality. In some embodiments, the organic component further comprises molecules of at least one non-fluorinated compound having at least one isocyanate reactive functionality.

In some embodiments, a fluorinated compound comprising a reaction product of a polyisocyanate component and a diol component or a diamine component or a mixture thereof, the reaction product further reacted with an organic component is a compound of Formula (I):

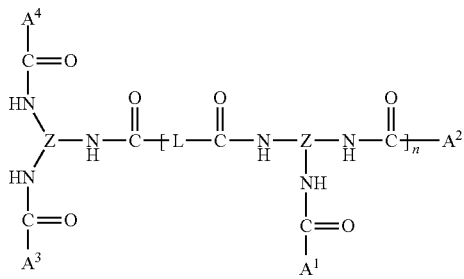

(I)

wherein Z is a trivalent organic group;

L is a divalent diol, diamine, urea, dialcohol amine or an aminoalcohol or a mixture thereof;

n ranges from 1 to 30;

and A1, A2, A3 and A4 are independently selected from the group consisting of Rf—Ra—X— and Ro-X—, wherein at least one of A1, A2, A3 and A4 is Rf—Ra—X—;

wherein Rf is a fluoroalkyl;

Ra is a direct bond, alkyl, —CmH2 mSO—, —Cm—H2mSO2-, —SO2N(R1)-, —CON(R1)-, wherein m ranges from 1 to 20 and R1 is hydrogen or alkyl; and X is —O—, —S— or —N(R2)-, wherein R2 is hydrogen or alkyl; and Ro is -alkyl, -alkenyl, -cycloalkyl, -chloroalkyl, -chloroalkenyl, -chlorocycloalkyl, —O-alkyl-glycidyl, —R3-O—R4

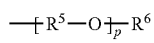

or —O—R24-O—C(O)—R25, wherein R3, R4, R5, R6, R24 and R25 are independently selected from the group consisting of alkyl and alkenyl and p ranges from 1 to 50 and wherein the alkyl and alkenyl of R3-R6, R24 and R25 are optionally independently substituted one or more times with a substituent selected from the group consisting of alkyl, alkenyl, and halo.

Income embodiments, A1 is independently selected for each repeating unit in Formula (I). In some embodiments of a compound of Formula (I), for example, A1 is Rf—Ra—X— in one repeating unit and Ro-X— in another repeating unit. Moreover, in some embodiments, A1 is the same in all or substantially all of the repeating units of a compound of Formula (I).

In some embodiments, Z is selected from the following trivalent organic compounds:

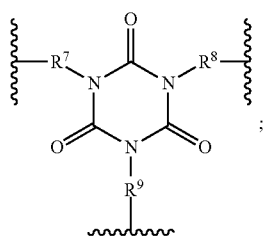

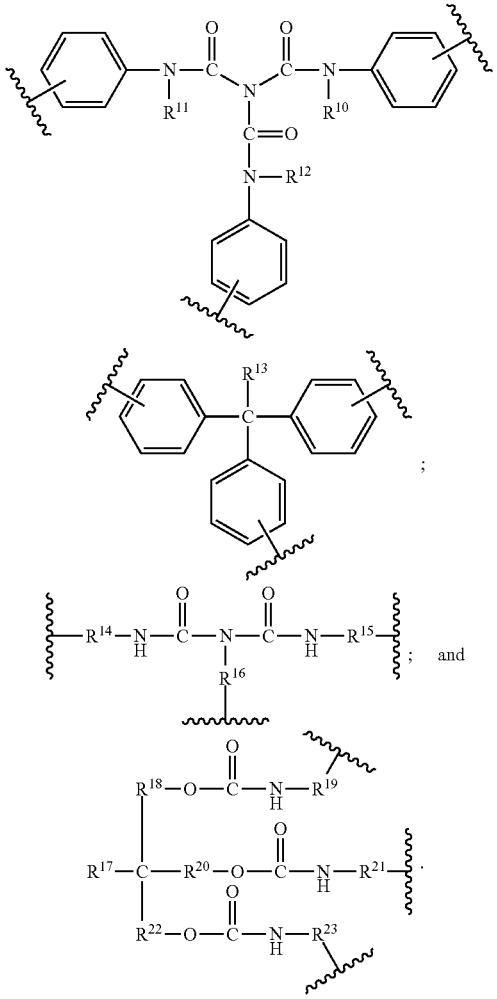

wherein R7, R8, R9, R13, R14, R15, R16, R17, R18, R19, R20, R21, R22 and R23 are independently selected from the group consisting of alkyl, alkenyl, cycloalkyl, and aryl; and wherein R10, R11 and R12 are independently selected from the group consisting of hydrogen and alkyl;

wherein the alkyl, alkenyl, cycloalkyl and aryl of groups of R7-R23 are optionally independently substituted one or more times with a substituent selected from the group consisting of -alkyl, -alkenyl, -fluoroalkyl, -chloroalkyl, bromoalkyl, -aryl, —O-alkyl, —O-alkenyl, —O-aryl, —O-alkylene-aryl, -carboxyl, -hydroxyl, -halo and -nitro; and wherein ⸭ is a point of attachment of the trivalent organic compound in Formula (I).

Moreover, in some embodiments, L can comprise any divalent diol, diamine, urea, dialcohol amine or aminoalcohol not inconsistent with the principles and objectives of the present invention. In some embodiments L is selected from the group consisting of ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cylcohexanediol, ethanolamine, diethanolamine, methyldiethanolamine or phenyldiethanolamine, aminopropanol or mixtures thereof.

In some embodiments, fluoroalkyl, Rf, is selected from the group consisting of CqF2q+1 and (CF3)2CFO(CF2CF2)t wherein q ranges from 4 to 20 and t ranges from 1 to 5. In one non-limiting embodiment, for example, q is 6.

Additionally, in some embodiments Ro is a monoalkyl ether of a polyalkylene glycol having the formula

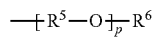

as defined above. In some embodiments, Ro comprises a monoalkyl ether of a polyethylene glycol, polypropylene glycol or copolymers thereof. In some embodiments, Ro comprises a chloroalkyl group.

Fluorinated compounds of the reaction products described herein, including fluorinated compounds of Formula (I), can have any desired molecular weight. The molecular weight of a fluorinated compound can be selected according to several parameters including the ability to provide an aqueous dispersion of the fluorinated compound without dispersing agents and/or the ability to exhaust the fluorinated compound onto a substrate.

In some embodiments, a fluorinated compound, including a compound of Formula (I), comprising a reaction product of a polyisocyanate component and a diol component or a diamine component or a mixture thereof, the reaction product further reacted with an organic component has a molecular weight of at least about 2,000. In some embodiments, a fluorinated compound has a molecular weight of at least about 4,000. In some embodiments, a fluorinated compound has a molecular weight greater than about 8,000. In one embodiment, for example, a fluorinated compound has a molecular weight ranging from about 8,250 to about 20,000. In another embodiment, a fluorinated compound has a molecular weight ranging from about 9,000 to about 15,000. In some embodiments, a fluorinated compound has a molecular weight less than about 2,000 or greater than about 20,000.

In another aspect the wax or wax emulsion may include an aqueous dispersion of a fluorinated compound comprising the reaction product of a polyisocyanate component and a diol component or a diamine component or a mixture thereof, the reaction product further reacted with an organic component as described herein. For example, the present invention provides aqueous dispersions of a compound of Formula (I). In some embodiments, aqueous dispersions of a fluorinated compound are free or substantially free of dispersing aids including, but not limited to, surfactants and/or organic cosolvents.

In some embodiments, a reaction product of Formula (IA) can be oligomeric or polymeric.

Method of Applying Wax

One suitable method for applying the sealer is a spray via a vacuum seal coater. Other suitable methods include coating, such as roll coating, dipping, padding, etc. and combinations thereof. The sealer must be applied in a way to cover the entire locking profile, including the vertical locking element and the horizontal locking element. The sealer may be applied to either the locking profile of first plank/board or to both locking profiles of a first and mating, second plank/board. The first and second plank/boards include a tongue and groove, respectively, upon engagement.

Method of Applying Coating—(One Option Single Hot Coat Covers the Short Ends to Seal the Grain)

Any coating method, as known in the art, is useful with water resistant flooring. The coating may be applied by spray, spreading, etc. If bevel end is included at a first or second edge, coverage of coating must extend over the bevel to prevent water absorption. This coating at the edges should typically be applied in the same manner as the top surface of the veneer, including at the same coating thickness. One suitable manner for applying the same coating level of the face or top surface is extended to the first and second edged (also referred to as long and short ends, is where the same coating level is a factory applied, continuous coating.) The coating should be sufficient to seal grain along the short ends to prevent water absorption.

Locking Profile

Figure 3:
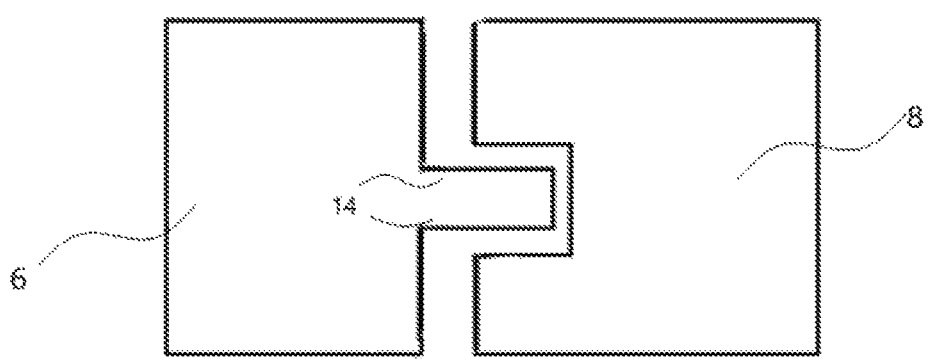
Figure 2:
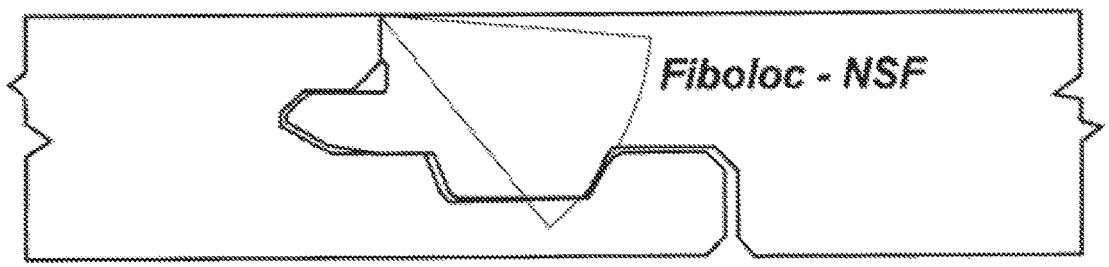
Figure 2:
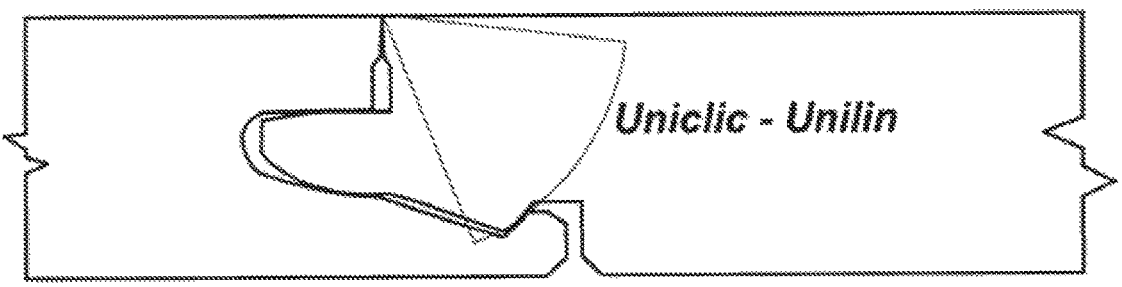
Figure 2:
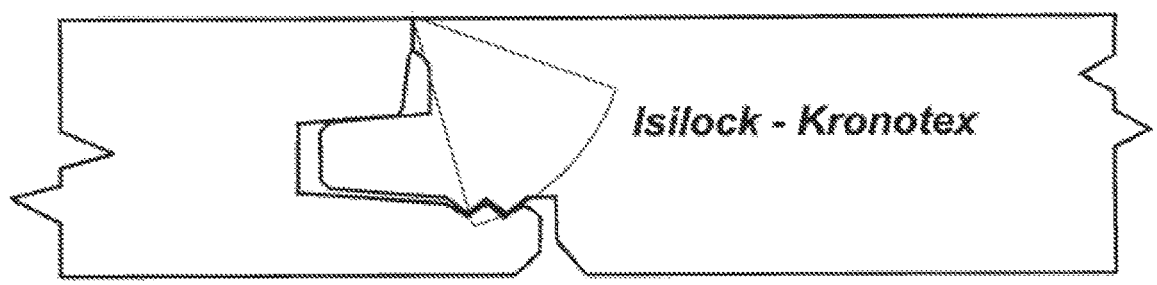
Figure 2:
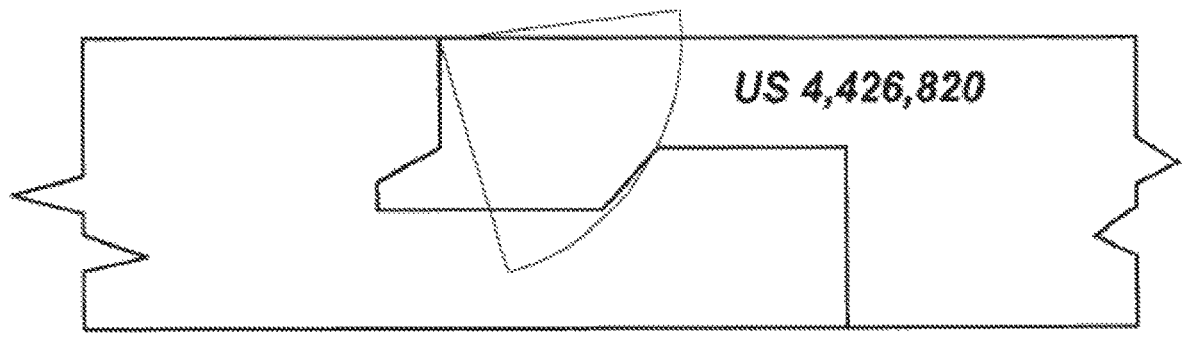

The wood flooring will include corresponding locking profiles along a first (long) edge and a second (short) edge. The term locking profile is intended to include a traditional tongue and groove as shown in FIG. 3 as well as those including at least one horizontal locking element and at least one vertical locking element. The term "vertical locking element" is intended to include a structure 14 that restricts or reduces movement of a tongue side 6 and a groove side 8 with respect to each other in a vertical direction 4. The term "horizontal locking element" in intended to include a structure 10 that restricts or reduced movement of a tongue side 6 and a groove side 8 with respect to each other in a horizontal direction 2. Many of these are known to those of skill in the art. Examples are shown in the FIG. 1 and FIG. 2 and also in U.S. Pat. No. 6,715,253B2, which is herein incorporated by reference in its entirety. Additional useful locking profiles include those in U.S. Pat. No. 6,898,913, also incorporated herein by reference. The locking profile will be prepared in solid wood for the solid wood embodiment, and from the core of a veneer/core structure.

The features and advantages of the present invention are more fully shown by the following examples which are provided for purposes of illustration and are not to be construed as limiting the invention in any way.

Examples

Wax Selection

Depending on the wax used, noise may be an issue on installation after the floor is in use (e.g., walking on the floor.) To prevent this, a wax that is not tacky upon application would be selected. Below is a table that describes certain commercially available waxes. Waxes may be chosen on whether they pass the water infiltration and/or installation tests.

Pass Installation Testing—

In order to pass the installation testing, the flooring, as installed, must not product audible noise when walked on.

Water Infiltration Test
  Materials
  Flooring
  12" long with side profile A
  6" long with side profile B and edge profile A
  6" long with side profile B and edge profile B
  3" PVC pipe 2" long
  White Silicone Sealant
  Water
  Method
  Prep samples so there is a "T" seam
  Side profile with an end profile
  Place the PVC pipe centered over the T seam
  Seal with silicone sealant
  Smooth out the silicone to ensure it has a tight seal
  Allow sealant to fully cure
  Add 30 mL of water to the PVP pipe Observe the samples and not if water leaks through the sample or topical damage
Observations
Observe the samples and not if water leaks through the sample
Types of Leaks
  Drip through the thickness of the product
  Surface leak (Water runs the edge of the profile and pools on the surface)
  Profile Leak (Water runs all the way through the profile and leaks out the end of the profile)
Topical Damage
  Is there any face checking or damage on the product ends
    Can usually be felt with your finger
    Sometimes visible outside the ring too on the edge
Observations are to be made after starting the test
10 minutes, 2 hours, 6 hours, 24 hours
Passing Test—After 24 hrs—No Visible Color Change As can be seen in the table below, only the invention engineered and the invention solid passed the water infiltration test.

The invention solid and invention engineered were prepared from solid and engineered wood, respectively, with a 2G lock according to U.S. Pat. No. 6,898,913, and TechKote EC 300 fluorowax applied throughout the locking profile.

| Product | Structure | Product Installation Fit | Water Infiltration Test (24 hrs) |
|---|---|---|---|
| Invention engineered | HDF & Veneer | Easily Installed (Flat) | Pass >24 hours |
| Invention solid | Solid wood | Easily Installed (Flat) | Pass >24 hours |
| Comparative product - Shaw Repel | HDF & Veneer | Could not put together | 10 minutes - drip through |
| Comparative product - US Floors/Shaw SmartCore Naturals | Polymer core (PC) & Veneer | Corners Break Easy | 10 minutes - front seam |
| Comparative product - Floor & Decor Aquaguard Wood | PC & Veneer | Slightly End lifted, Tight fit | 10 minutes - seams |
| Comparative product - Floor & Decor Aquaguard Stranded Bamboo | PC & Bamboo Face | Extremely tight, moderate end lift and difficult to install | 10 minutes - front seam |
| Comparative product - Floor & Decor Aquaguard Laminate | HDF Laminate | Extreme Overwood on ends | 4 hours - side seam |

While there have been described what are presently believed to be the preferred embodiments of the invention, those skilled in the art will realize that changes and modifications may be made thereto without departing from the spirit of the invention, and it is intended to include all such changes and modifications as fall within the true scope of the invention.

The invention claimed is:

1. A method for preparing a water resistant wood flooring comprising:
  (i) preparing first and second wood flooring components, wherein said preparing includes:
    (a) for each of said first and second wood flooring components, providing a top wood veneer having a top surface and a bottom surface, a balance layer having a top surface and a bottom surface, and a core;
    (b) for each of said first and second wood flooring components, adhering said bottom surface of said top wood veneer to a top of said core and adhering said top surface of said balance layer to a bottom of said core;
    (c) forming a first locking profile in an edge of said core of said first wood flooring component;
    (d) forming a second locking profile in an edge of said core of said second wood flooring component, said second locking profile formed to lockingly engage said first locking profile of said first wood flooring component;
    (e) for each of said first and second wood flooring components, applying a coating to the top surface of said top wood veneer and to said bottom surface of said balance layer;
    (f) applying a sealer to substantially cover each of said first and second locking profiles, said sealer being a wax which is flowable at room temperature and which is non-tacky upon application, wherein said sealer is applied at about 0.2 to 5 grams per linear meter in sufficient quantity to flow into voids along an interface between said first locking profile and said second locking profile with said first locking profile lockingly engaging said second locking profile in forming a seal along the interface between said first locking profile and said second locking profile;
  (ii) lockingly engaging said first locking profile of said first wood flooring component with said second locking profile of said second wood flooring component, wherein, with said first locking profile lockingly engaging said second locking profile, said sealer flows into voids along the interface between said first locking profile and said second locking profile in forming the seal along the interface between said first locking profile and said second locking profile, wherein, with standing water resting atop portions of said coatings of said top wood veneers of said first and second wood flooring components, the standing water spanning across the interface, the seal prevents infiltration of the standing water along the interface, through said balance layers of said first and second wood flooring components, for at least 24 hours.

2. The method of claim 1, wherein the first locking profile is a tongue and groove locking profile.

3. The method of claim 1, wherein said sealer is applied by spraying.

4. The method of claim 3, wherein said spraying is conducted by a vacuum seal coater.

5. The method of claim 1, wherein said sealer is applied by roll coating.

6. The method of claim 1, wherein said sealer is applied by dipping.

7. The method of claim 1, wherein said sealer is applied by padding.

8. The method of claim 1, wherein the first locking profile includes at least one horizontal locking element and at least one vertical locking element.

9. The method of claim 1, wherein, for each of said first and second wood flooring components, said coating is applied to said top surface of said top wood veneer such that said coating seals wood fibers of all exposed wood of said top surface of said top wood veneer.

10. The method of claim 1, wherein, for each of said first and second wood flooring components, said core includes high density fiberboard.

11. The method of claim 1, wherein said first wood flooring component has a thickness of about 5 mm to about 20 mm.

12. The method of claim 1, wherein said first wood flooring component is a plank or a tile.

13. The method of claim 1, wherein said sealer includes at least one fluorinated compound.

14. The method of claim 13, wherein said at least one fluorinated compound includes a reaction product of a polyisocyanate component and a diol component or a diamine component or a mixture thereof.

15. The method of claim 1, wherein said wax includes a microcrystalline wax.

16. The method of claim 1, wherein said wax includes a paraffin wax.

17. The method of claim 1, wherein, for each of said first and second wood flooring components, said balance layer includes a wood veneer.

* * * * *